3,552,940
CIRCUMFERENTIAL STRESSING OF CONCRETE PRESSURE VESSELS
John Richard Portas, Ruislip, and Rodney Richard Carter, Reading, England, assignors to Taylor Woodrow Construction Limited, Southall, Middlesex, England, a British company
Filed Mar. 6, 1968, Ser. No. 711,026
Claims priority, application Great Britain, Mar. 7, 1967, 10,774/67
Int. Cl. B21d *39/00;* F16g *11/00;* E04c *3/10*
U.S. Cl. 29—452                              11 Claims

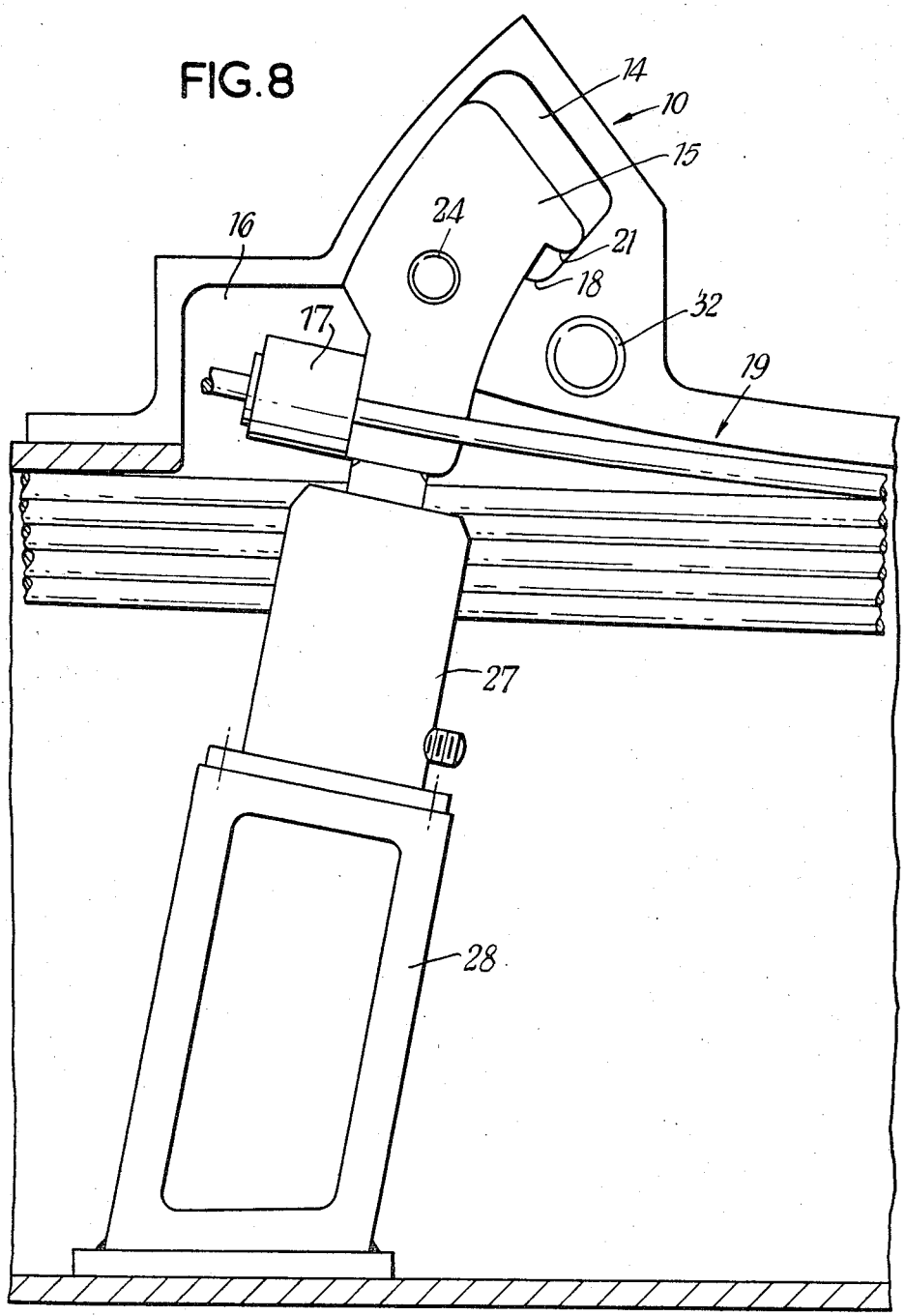

ABSTRACT OF THE DISCLOSURE

In cases where pre-stressing strands are wound under tension around a concrete pressure vessel in order circumferentially to stress the same and the windings are disposed in troughs or channels in or on the outer surface of the vessel the terminal end of each prestressing strand is anchored through the medium of an anchorage member which is supported for limited sliding movement in an appropriately shaped recess in one wall of the trough or channel in which the windings of the strand have been laid. With the anchorage member in a position wherein it projects from the recess the terminal end of the strand is attached to said member which is thereafter forced together with the anchored end portion of the strand into the recess clear of the trough or channel.

---

Figure 1:
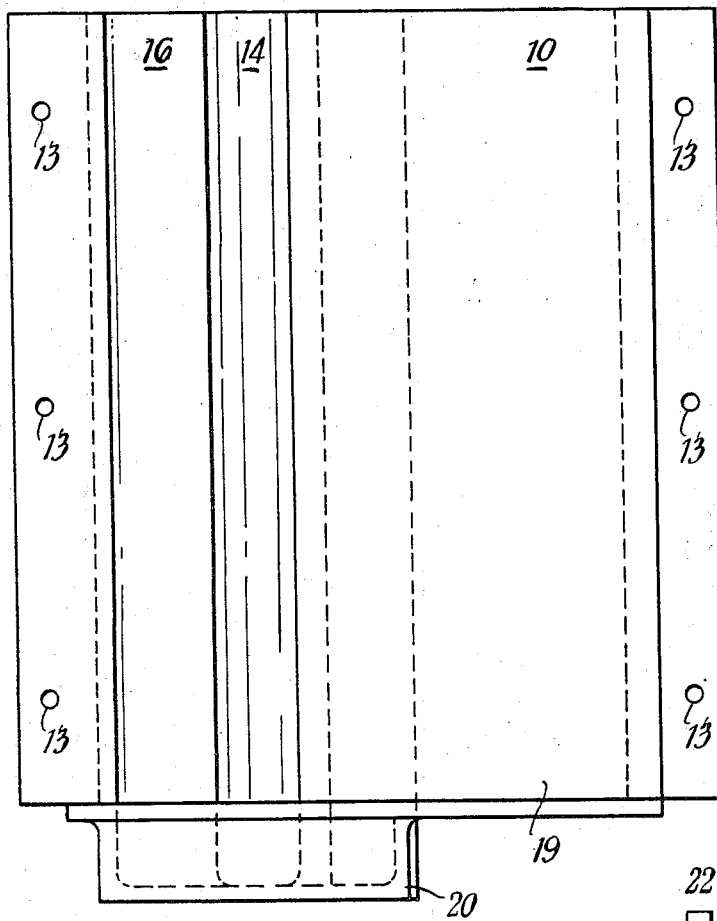

This invention is concerned with the circumferential stressing of concrete pressure vessels such as are for example employed in nuclear power stations or for the storage of gas or other medium under pressure.

We have proposed circumferentially to stress pressure vessels of the kind indicated by winding pre-stressing wires circumferentially therearound, a plurality of layers of such wires, which are wound onto the vessel under tension, being accommodated in each of a plurality of circumferential troughs or channels which are provided at appropriately spaced points in or on the outer surface of the vessel and serve to locate the layers of wire. With such a circumferential stressing system it is essential that the layers of wire accommodated in each trough or channel shall be carefully and accurately laid so that successive turns are disposed in close side-by-side relationship without any crossing of one turn over the next.

A system such as is indicated poses problems when it comes to anchorage of the ends of the lengths of prestressing wire particularly since it must be borne in mind that the wire is wound on under a predetermined tension and that the tension must be maintained with no variations. To ensure constant or uniform tension the wire turns must, as indicated above, be laid accurately to provide completely uniform wire layers and hence any anchorage employed for the wire ends must be of such a nature that it does not obtrude into or cause any obstruction or impediment in the trough or channel such as would inhibit the proper laying of subsequent wire layers over the top of an already anchored wire.

It is the chief object of the invention to evolve means for effectively anchoring prestressing wires wound or laid under tension in a circumferential trough or channel in or on the outer surface of a concrete pressure vessel, such means allowing for the obtention of completely uniform wire layers i.e. layers wherein the turns of wire are even and lie in close side-by-side relationship without any crossing of one turn over the next.

According to the present invention means for anchoring an end of a pre-stressing wire in a trough or channel will comprise a socket element formed or located in a side wall of such trough or channel and a peg to which the end of the wire may be attached, such peg being supported within the socket element for sliding movement from a projected position which will allow of attachment of the wire thereto to an anchoring or retracted position wherein the connection of the wire to the peg and said peg itself will be housed within the socket element clear of the trough or channel.

In further accordance with the invention there is provided a method of anchoring the terminal end of a prestressing wire which has been wound under tension around the circumference of a pressure vessel with the turns of wire located in a trough or channel in or on the outer surface of said vessel, such method consisting in coupling the wire end to a peg which is caused to project laterally from a side wall of the trough or channel and thereafter forcing said peg together with the wire end coupled thereto into a socket in said side wall so that the anchored end of the wire and the peg will be accommodated in said socket and clear of the trough or channel.

Figure 2:
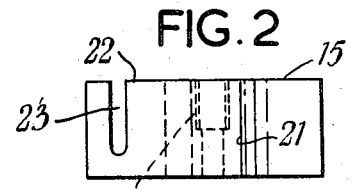
Figure 3:
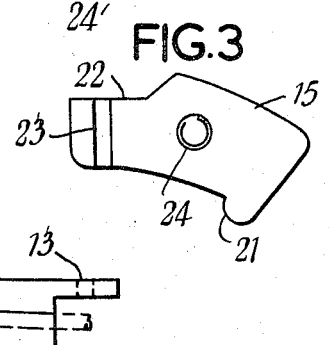
Figure 4:
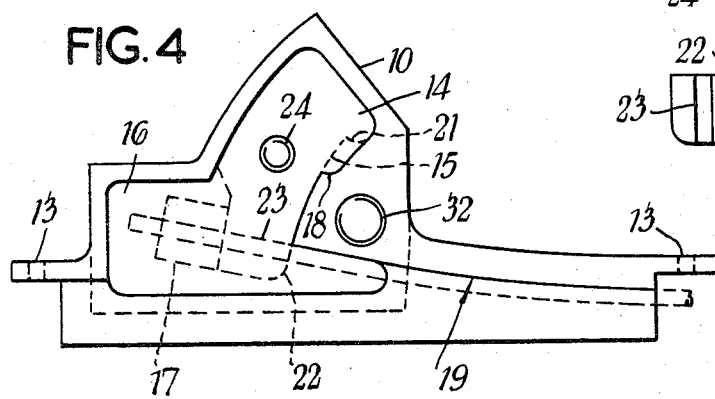

In order that the said invention may be clearly understood and readily carried into effect, reference will now be made to the accompanying drawings in which:

FIG. 1 is a front elevational view of a socket element forming one part of a wire anchorage assembly, FIGS. 2 and 3 are respectively a side elevational and plan view of a so-called peg which constitutes another part of the wire anchorage assembly and is adapted to be accommodated in the socket element, FIG. 4 is a plan view of the socket element, the aforesaid peg of FIGS. 2 and 3 being shown in dotted lines in its retracted or operative wire anchorage position.

Figure 5:
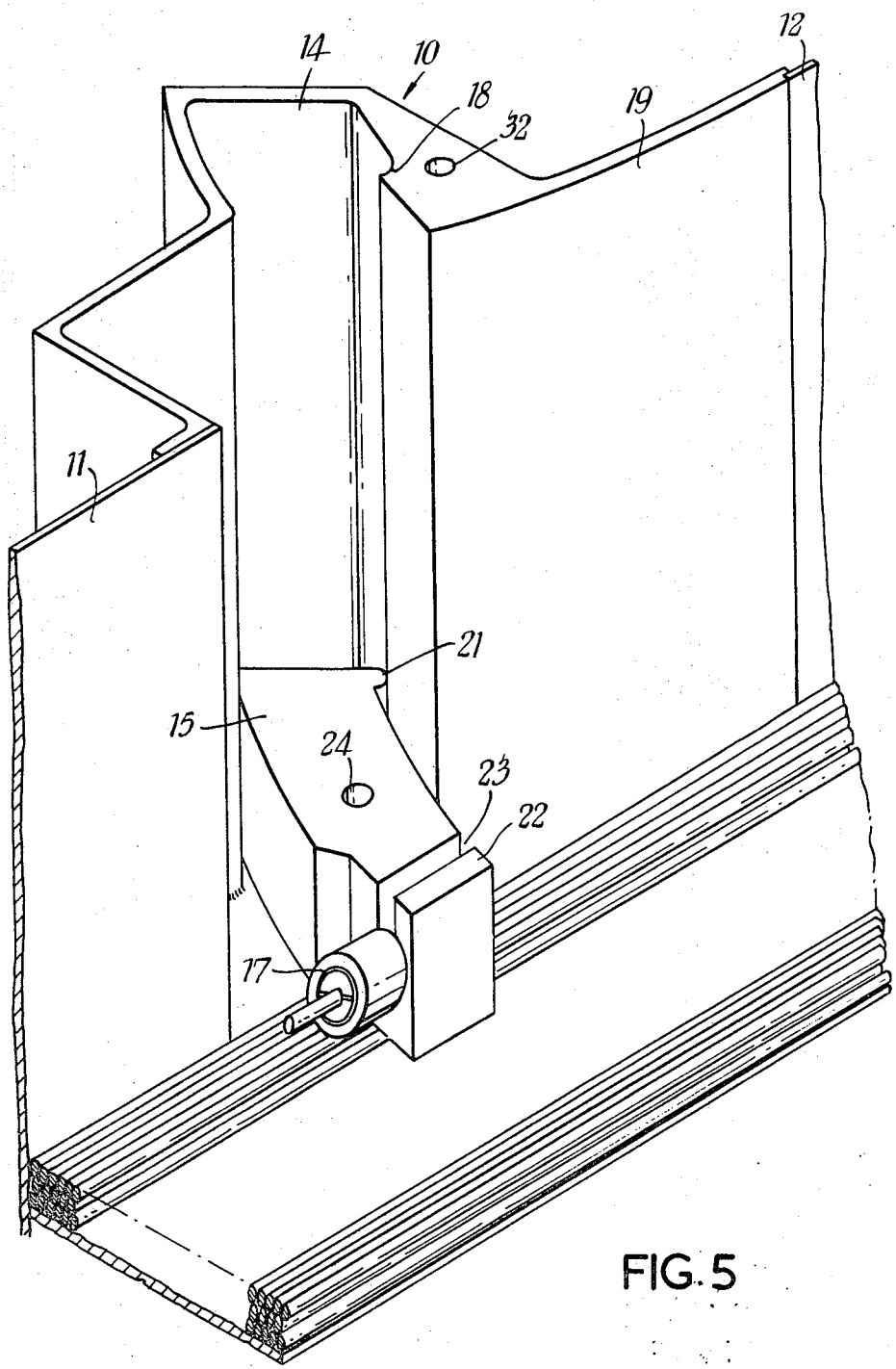
Figure 6:
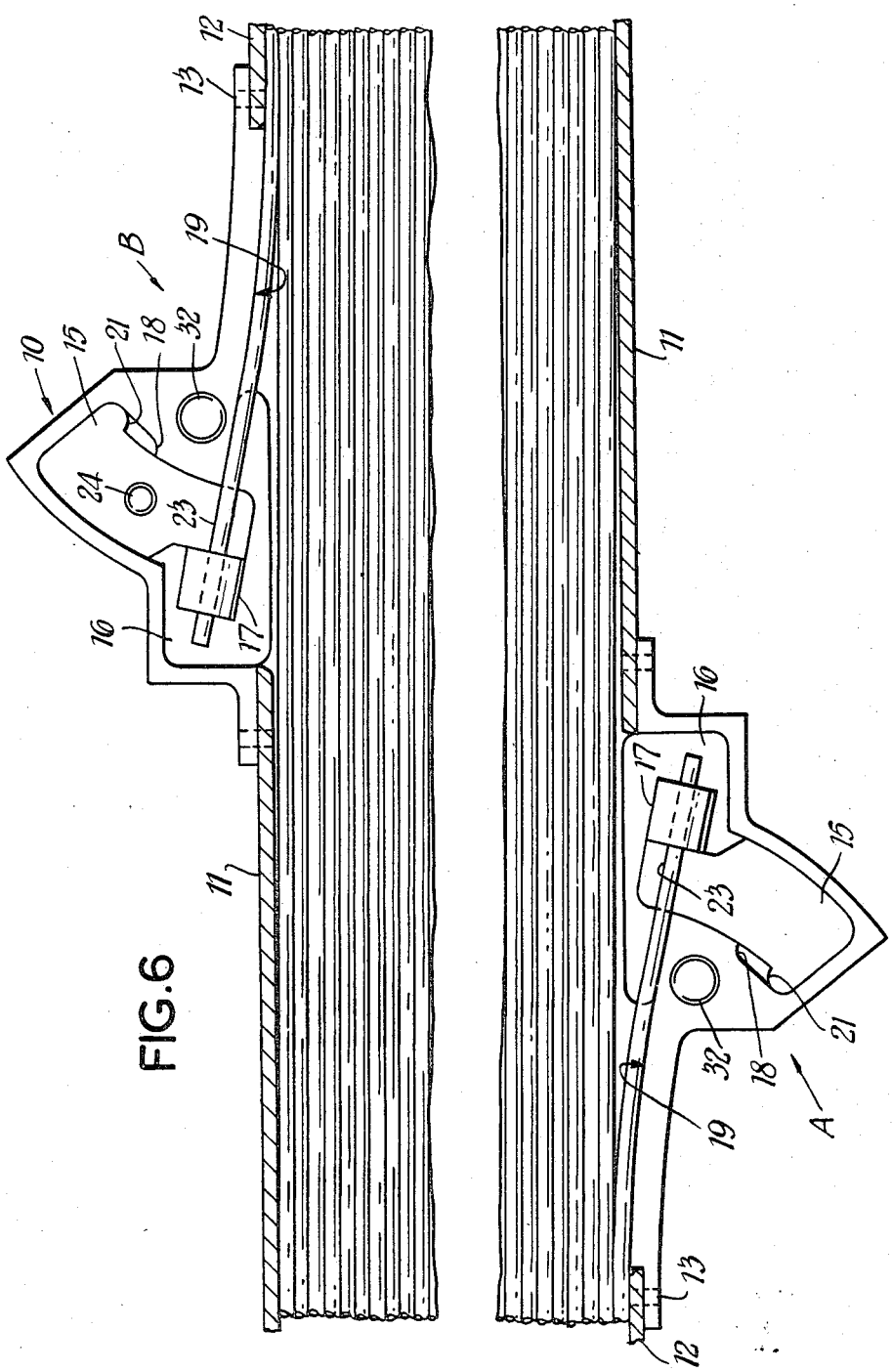
Figure 7:
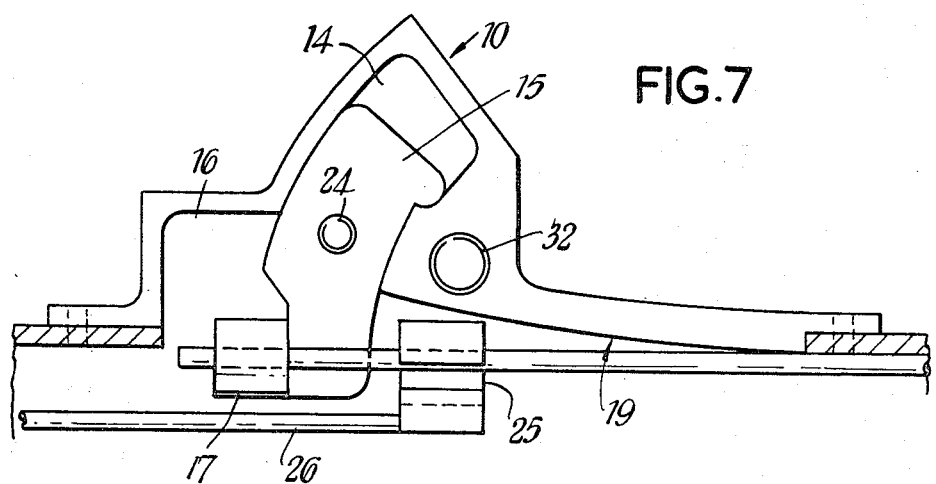
Figure 11:
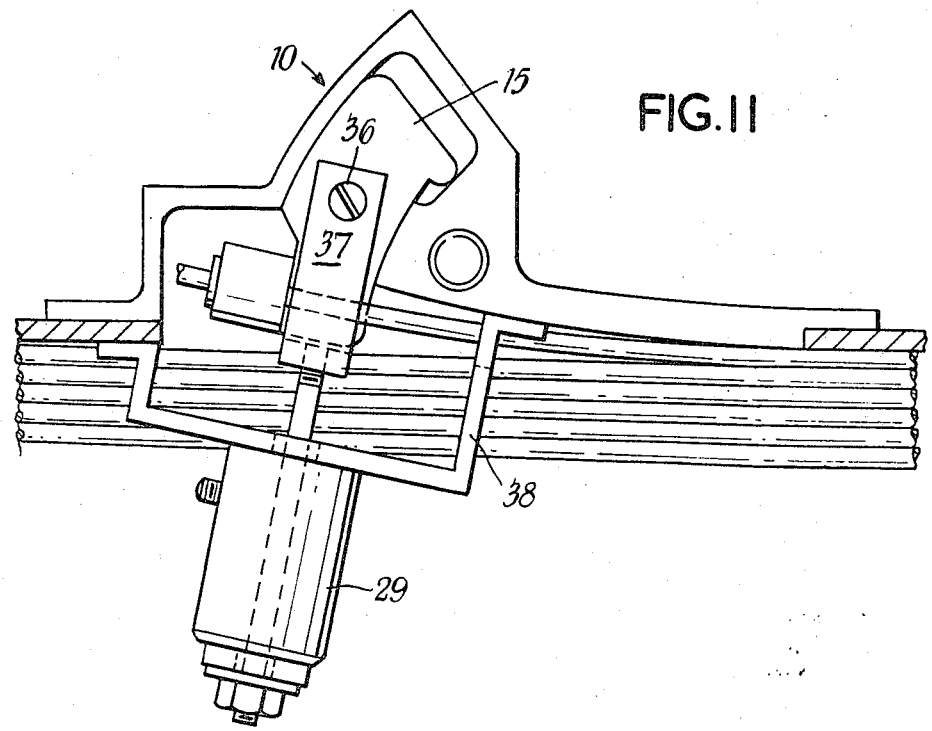
Figure 9:
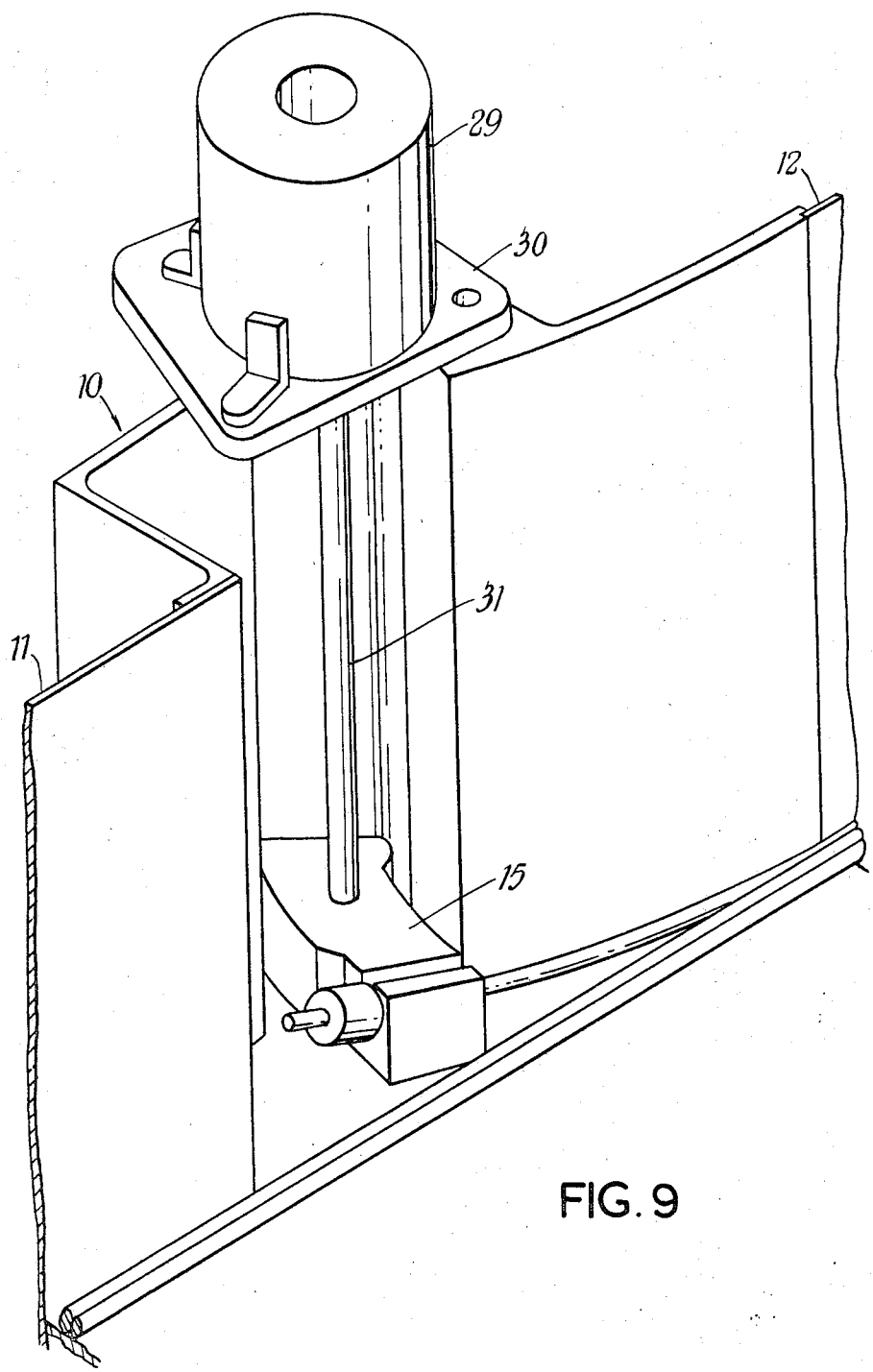
Figure 10:
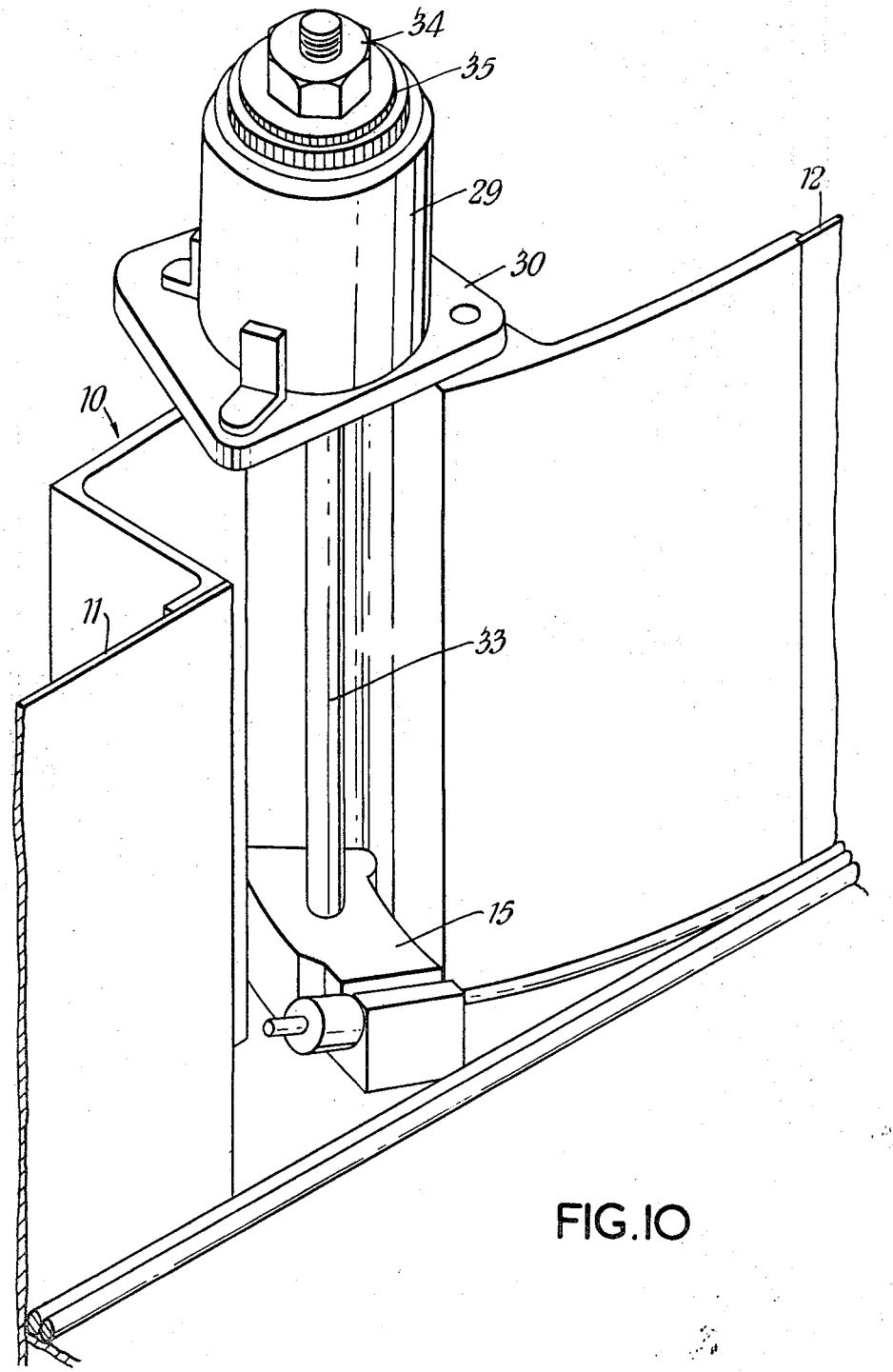

FIG. 5 is a perspective view of the wire anchorage assembly showing the peg in a position approaching its fully projection position, FIG. 6 is a plan view of a part of a channel which extends around a concrete pressure vessel and accommodates the turns of prestressing wire wound under tension around said vessel, the figure illustrating the relative positions of the initial and terminal anchorage assemblies for one length or run of wire both assemblies being shown in the operative or anchorage position, FIG. 7 illustrates one way in which a tensioned prestressing wire may be disconnected from the peg should such a course become necessary, FIGS. 8–9 illustrate possible ways of locating the peg in its operative or anchorage position, FIGS. 10 and 11 illustrate possible ways of removing the peg from its operative or anchorage position should such a course ever be necessary.

Referring now to the drawings 10 generally denotes a socket element which is formed of cast iron or steel or some other appropriate material. As shown in FIG. 5 the socket element is adapted to be located between mild steel or other plates 11 and 12 which constitute a liner for a side wall of a trough or channel in which turns of prestressing wire are to be laid. The socket element will be bolted, welded, or otherwise fixedly secured to the linear plates 11 and 12, and the joints between said element and said plates will if necessary be sealed by an epoxy or other appropriate composition in order to provide an effective moisture barrier which will prevent seepage of moisture into the trough or channel from the surrounding mass of concrete in which said trough or channel is located. In the actual embodiment illustrated it is intended that the socket element shall be bolted to the plates 11 and 12 and it is for that reason that said element is provided with the holes 13 at its opposed lateral edges. As will be seen from FIGS. 4 and 5 the socket element includes a main recess 14 of generally arcuate shape in plan such recess being adapted to accommodate and guide an appropriately shaped peg 15 so that when the latter is disposed in the socket element it will be capable of a limited projective and retractive movement as will be hereinafter more fully explained. As will also be seen from FIGS. 4 and 5 the main recess 14 is enlarged or extended at one side as indicated at 16 to allow for accommodation of a wire anchor 17 when the peg 15 is in its retracted or anchorage position as shown in FIG. 4. The recess 14 is also formed with a shoulder 18 which is adapted to limit the extent of the projective movement of the peg as will be hereinafter explained and as will be clearly seen from FIGS. 4 and 5 the socket element is formed with a relatively long and gently curved surface 19 leading from said recess which surface will allow for a smooth transition of the wire from or to the anchorage point and into or from the trough or channel in which the turns are laid. As will be clearly seen from FIG. 1 the socket element is extended at its lower part as indicated at 20 so that the recess 14 and its enlargement or extension 16 will extend downwardly beyond the general bottom plane of the socket element.

The peg 15 comprises a block of metal, such as steel, of generally rectangular shape in section and of arcuate shape in plan. At its rear end the peg is formed with a shoulder 21 which is adapted when said peg is disposed in the socket element to cooperate with the aforesaid shoulder 18 in the latter, thereby to limit the extent of projective or forward movement of the peg. At its forward end the peg is formed with a nose portion 22 incorporating a slot 23 adapted to accommodate a pre-stressing wire. In the particular embodiment illustrated the peg is also provided with a hole 24 which extends completely therethrough and is threaded for a part only of its length. The purpose of the hole 24 will be hereinafter explained but it may be mentioned here that while such a hole is provided in the present embodiment it is not necessarily an essential feature of the construction and may in some circumstances be omitted. The use of a curved peg of the general form illustrated will ensure that the tension which is applied to the wire during winding will remain substantially unaltered during the carrying out of an anchorage procedure as hereinatfer described.

The components as so far described constitute and anchorage assembly. When pre-stressing wire is to be wound into a trough or channel in the outer surface of a concrete pressure vessel it is necessary to provide for anchorage of both ends of the wire and the two anchorages will be arranged at opposite sides of the trough or channel. In order to ensure obtention of completely uniform wire layers i.e. layers wherein the turns of wire are even and lie in close side-by-side relationship without any crossing of one turn in any layer over the next in that layer it is necessary to arrange that the initial and terminal anchorages of the wire shall be offset or displaced relatively to each other somewhat as indicated in FIG. 6. The amount of such displacement may be of the order of 18–30 inches but that figure is purely exemplary.

It may be mentioned here that in the pre-stressing of a concrete pressure vessel the number of turns of wire required to be laid in each trough or channel will necessitate the use of a number of lengths of wire and since, if a completely uniform wire lay is to be obtained, it will not be possible to anchor the ends of successive lengths at the same initial and terminal anchorage points a succession of pairs of socket elements will be disposed along the trough or channel, the socket elements of each pair being disposed as indicated in opposing side walls of the trough or channel in offset relationship, and the successive pairs of socket elements being appropriately spaced from the preceding pair along the length of said trough or channel.

Assuming that a trough or channel is provided with anchorages in the manner indicated in FIG. 6 then when it is required to wind a prestressing wire, the free end portion of the wire will be introduced into the slot 23 in the appropriate peg 15 and will be anchored by the application to the wire end of a barrel and wedge type anchor of known type such as indicated at 17. At this stage the wire is not under tension and it may be laid in the slot 23 in the peg with the latter in either its retracted or projected position. If the peg 15 is in its projected position when the wire is attached thereto then before winding it will be necessary to move said peg into its retracted position and to ensure that it will be located properly in the downwardly extended portion 20 of the recess 14 and its associated enlargement or extension 16 so that the wire leading from the peg will be disposed at the correct level on passing into the trough or channel. With the initial end of the wire anchored said wire will be wound in successive turns around the vessel, care being taken to ensure that a perfect lay is obtained and that there is no free space between turns or crossing of one turn over another. The wire will be laid or wound under tension for example by means of a winding machine such as is described in the specification of our prior British patent application No. 36,324/66. When the appropriate number of turns of wire have been laid it then becomes necessary to anchor the terminal end of the wire while still maintaining the tension therein. To effect such anchorage the peg 15 at the terminal anchorage i.e. at the position B, if, as shown in FIG. 6 the initial anchorage was at A, is moved into its projected position and the wire still under tension is laid in the slot 23 of the peg. A barrel and wedge type anchor, such as is indicated at 17 will then be affixed at the appropriate side of the peg so as to anchor the wire and maintain the tension therein. It may be mentioned here that in place of the barrel and wedge type anchor illustrated any other suitable type of anchor may well be employed. With the anchor securely applied, the wire leading from the winding machine may then be severed. Before severing the wire it is essential to ensure that the wire windings are correct in every respect since once the wire is parted from the winding machine it will be difficult to re-connect it and if any fault is subsequently discovered the windings made would have to be removed and winding operation repeated.

If it should be necessary to remove any windings after anchorage then with the peg in or still in its projected position it may be possible merely to cause failure of the wire at a point adjacent the peg by application of heat as by means of a blow torch. Such a method is not considered really satisfactory however and can only be used in certain circumstances since the heat may adversely affect underlaying wire turns which did not require removal. Alternatively the wire might be severed at an appropriate point by wire cutters but in such a case the energy released from the tensioned wire could be destructive to personnel and apparatus. A preferred method of removing unwanted or faulty windings is illustrated in FIG. 7. In this case a block such as is indicated at 25 is applied to the wire at that side of the peg remote from the anchor 17, such block being formed with a conical bore adapted to accommodate wedges so that it will be equivalent to a barrel and wedge anchor. With the wedges hammered home so that the wire is securely gripped in the block, a pull is exerted on the block through the medium of the wire or cable 26 attached thereto thereby to exert an increased tension on the wire such as will release the pull hitherto exerted by the wire on the anchor 17 so that the latter may then be removed. With the anchor 17 removed the wire turns may then be removed, the tension on the wire being progressively relaxed by relaxing the tension on the wire or cable 26.

Assuming that the wire has been correctly laid and that the terminal end has been anchored and the wire severed from the winding machine, i.e. the state of the anchorage operation is as shown in FIG. 5, it then becomes necessary in order to complete the anchorage operation to force the peg 15 back into its retracted position wherein the anchorage will be housed completely within the socket element and clear of the trough or channel so that it will not hamper or adversely affect the laying of any other successive wire layers. This return or retractive movement of the peg may conveniently be effected by means of a hydraulic jack or ram such as is indicated at 27 in FIG. 8. As will be seen from that figure the jack or ram together with an appropriate stool or support 28 is merely introduced into the trough or channel, the opposing wall of the trough or channel providing for the necessary reactive force on extension of the jack or ram. With the peg 15 retracted the jack or ram will be removed and it will then be necessary to push said peg downwardly in the socket element so that the final turn of wire will be correctly located in the plane of the preceding turns or windings. The downward movement of the peg may be effected in the manner shown in FIG. 9 from which it will be seen that a jack or ram 29 is located on a plate 30 which is bolted to the upper end of the socket element. A rod 31 which is threaded into the hole 24 in the peg 15 is coupled to the jack or ram, the arrangement being such that on appropriate actuation of the latter the necessary downward movement of the peg will be effected. It is to allow for the bolting of such a plate 30 thereto that the socket element is provided with a threaded hole as indicated at 32.

If at any time it should be necessary to remove the peg from its operative or anchorage position it will be necessary first to raise said peg sufficiently so that it will be above the level of the wire windings in the trough or channel and then after having raised it appropriately, subsequently to force it into its projected position so as to allow disconnection of the wire therefrom in either of the ways previously indicated.

The necessary initial raising of the peg may be effected in the manner indicated in FIG. 10. In this case the plate 30 together with the jack or ram 29 is again located at the upper end of the socket element and said jack or ram is operatively connected to the peg 15 by means of a rod 33 which is threaded into the hole 24 in said peg. In this case the upper end of the rod 33 projects upwardly through the plunger of the jack or ram and the rod is effectively coupled to the plunger by virtue of the application to the upper end thereof of a nut 34 and appropriate packing pieces 35. It will be appreciated that with such an arrangement an appropriate upward movement may be imparted to the peg 15 on appropriate actuation of the jack or ram.

Having raised the peg the rod is disconnected therefrom and the jack or ram is removed whereupon the U-shaped bracket 37 is applied on the end of the peg and connected to the latter by means of a short rod 36 as indicated. The rod 36, which is inserted into the hole 24 on the peg, is threaded for a portion of its length corresponding to the length of the threading in the hole 24, this being to ensure that the threads in the hole will not be damaged as a result of the further operations to be described. With the U-shaped bracket 37 attached to the peg such bracket is coupled to the jack or ram 29 which is again positioned in the trough or channel being supported on a yoke 38 which as will be seen from FIG. 11 is provided with legs of unequal length. This form of yoke is employed to ensure that when the jack or ram 29 is operated a pull will be applied to the peg which is at right angles to the curving centre line of the latter. If a yoke with legs of equal or not appropriately relatively dimensioned legs were employed and a straight pull were exerted on the peg at right angles to the plane of the face of the socket element the peg would tend to jam or become locked.

It may be mentioned here that the methods described above for manipulating the peg i.e. for imparting retractive movement thereto and effecting lowering thereof after anchorage of the terminal end of the wire, and also for effecting removal of the peg should it become necessary, are purely exemplary. Such manipulations of the peg as are necessary may well be performed in other ways but those described above have been found by the applicants to be convenient and effective.

It may also be mentioned here that one socket element may be employed to accommodate a number of pegs one above the other. Due to the necessity for obtaining perfect wires lays it will not of course be possible to locate a further peg immediately on top of one which is already in place. Due to the thickness of the peg it will be necessary to ensure that a number of layers of wire are present in the trough or channel above the level of the anchorage afforded by one peg before a second is inserted in the same socket element.

While it is considered preferable to employ an arcuate shaped peg as above described and illustrated since such a construction will not increase or otherwise vary the tension in the wire on anchorage of the latter, it would readily be feasible to employ a straight or other shaped peg with appropriate modification of course in the socket element.

Furthermore, while in the foregoing reference has been made solely to prestressing wire or wires it is to be understood that in place of wires any appropriate form of strand, tape or other similar prestressing material may well be employed.

In conclusion it may be stated that the employment of an anchorage of the kind above described and illustrated gives rise to the advantage that it is possible to ensure that such gaps as are necessarily present in the walls of a trough or channel will be of a minimum width with the result that the wire or strand will be given the maximum side restraint, i.e. greater side restraint than would occur if wider gaps were present.

We claim:

1. Means for anchoring an end of a pre-stressing wire in a trough or channel comprising a socket element formed or located in a side wall of such trough or channel and a peg to which the end of the wire may be attached, such peg being supported within the socket element for sliding movement from a projected position which will allow attachment of the wire thereto to an anchoring or retracted position wherein the connection of the wire to the peg and said peg itself will be housed within the socket element clear of the trough or channel.

2. Means as in claim 1 in which the peg is of arcuate form when viewed in plan, the socket element being provided with a correspondingly shaped recess thereby slidably to accommodate the peg.

3. Means as in claim 1 wherein the peg includes a stop adapted on projective movement of said peg to abut a corresponding stop in the socket element thereby to limit the extent of such projective movement.

4. Means as in claim 1 in which the peg is provided at its foremost end with a transverse slot adapted to accommodate a prestressing wire, effective connection of the wire to the peg being effected by means of an anchor which is fixedly applied to the wire and is adapted when said wire is in place in the slot to abut one side face of the peg.

5. Means as in claim 1 wherein the peg is provided with a threaded aperture to allow attachment thereto of devices which may be employed for manipulating the peg.

6. Means as in claim 1 in which the socket element is so formed that when the peg is moved to its retracted position the peg will be capable of a subsequent movement lengthwise of the socket in a direction at right angles to the projective and retractive movements.

7. Means as in claim 5 wherein the devices for manipulating the peg include a rod which is adapted to be threaded into the aperture in the peg and also to be coupled to an hydraulic jack or ram positioned at the upper or outer end of the socket element, the arrangement being such that an appropriate actuation of the jack or ram the peg will move lengthwise of the socket element.

8. Means as in claim 5 in which the devices for manipulating the peg include a rod adapted when the peg is in a retracted position to be introduced into the aperture in said peg thereby to allow the attachment to the latter of a coupling element whereby said peg may be connected to an hydraulic jack or ram which is in turn supported on a yoke element adapted to serve as a reaction member, the arrangement being such that with the jack or ram and its supporting yoke element appropriately positioned in the trough or channel the jack or ram may be actuated to pull the peg into its projected position.

9. A method of anchoring the terminal end of a prestressing wire which has been wound under tension around the circumference of a pressure vessel, with the turns of wire located in a circumferential trough or channel in or on the outer surface of said vessel, said method consisting in coupling the wire end to a peg which is caused to project laterally from a side wall of the trough or channel and thereafter forcing said peg together with the wire end coupled thereto into a socket in said side wall so that the anchored end of the wire and the peg will be accommodated in said socket and clear of the trough or channel.

10. A method as in claim 9 wherein the peg is forced into the socket by means of an hydraulic jack or ram which is positioned transversely of the trough or channel with one end in contact with the peg and the other in contact with the opposing wall of the trough or channel.

11. A method according to claim 9 in which subsequent to the movement of the peg into the socket a further movement is imparted to said peg in a direction at right angles to the plane of initial movement, such further movement being effective by means of an hydraulic jack or ram.

References Cited
UNITED STATES PATENTS 2,294,398  9/1942  Ferguson _____ 29—452UX
3,258,033  6/1966  Ohnstad _____ 29—452UX CHARLIE T. MOON, Primary Examiner U.S. Cl. X.R.

24—136; 52—224; 254—29